Oct. 11, 1927.
E. T. CUNNINGHAM
1,644,713
AUTOMOBILE SHIPPING DECK
Filed May 2, 1925
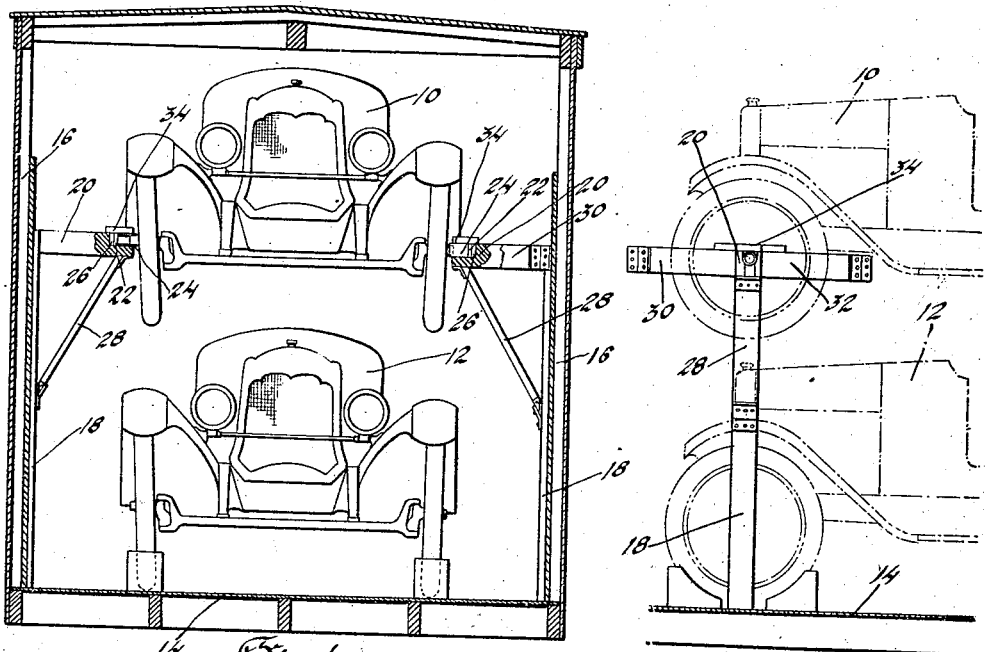
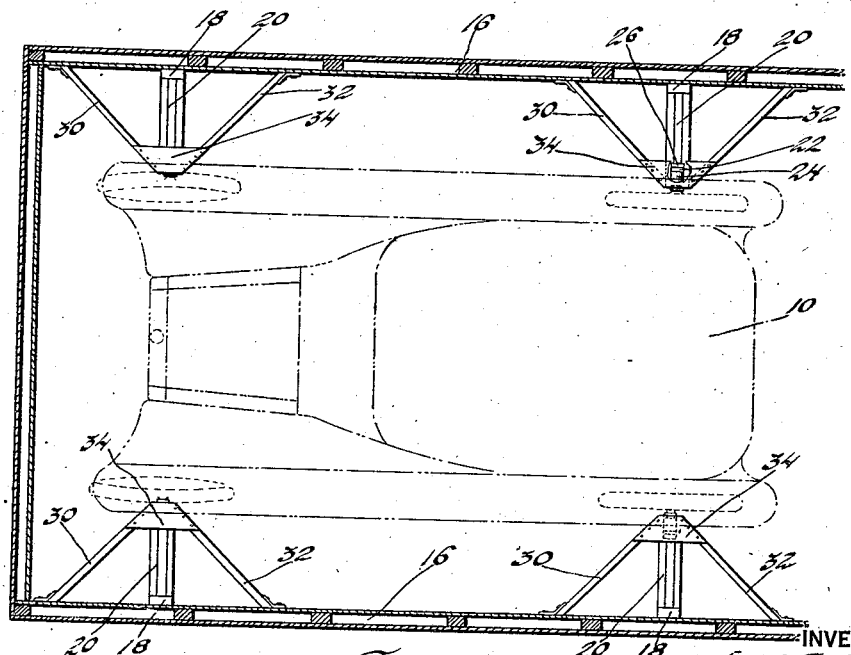
INVENTOR
Earl T. Cunningham
BY
Blackmore, Spencer & Fleit,
ATTORNEYS.

Patented Oct. 11, 1927.

1,644,713

UNITED STATES PATENT OFFICE.

EARL T. CUNNINGHAM, OF LANSING, MICHIGAN.

AUTOMOBILE SHIPPING DECK.

Application filed May 2, 1925. Serial No. 27,520.

This invention relates to decks for shipping automobiles in freight cars, and an object of the invention is to minimize the cost by providing a deck using a comparatively small amount of lumber of the high quality required in supporting an expensive article like an automobile. In the illustrated embodiment, the hub is supported on a horizontal arm, the weight being taken on a brace extending from the free end of the arm to an intermediate part of a vertical leg (which may be of cheaper stock) secured to the side wall of the freight car. The free end of the arm is also suitably braced longitudinally of the freight car. Preferably the hub rests in an elongated notch in the horizontal arm, to allow for differences in distance between opposite decks, the notch being filled, if desired, by a spacer block.

The above and other objects and features of the invention, including various particular novel details, will be apparent from the following description of one illustrative embodiment shown in the accompanying drawings, in which:

Figure 1 is a vertical transverse section through a freight car, showing upper and lower automobiles ready for shipment;

Figure 2 is a top plan view of the decks, with the position of the upper automobile indicated in dot-and-dash lines; and Figure 3 is a side elevation of one of the decks, looking outward from inside the freight car, with the automobiles indicated in dot-and-dash lines.

In the arrangement selected for illustration, an upper automobile 10 is supported by four of my novel decks above a lower automobile 12, in a box car having a floor 14 and side walls 16.

Each of the four decks comprises a vertical leg 18, which may be of relatively inferior stock, and which is to be nailed to the side wall 16. To the upper end of leg 18 is secured a horizontal arm 20, shown as made of three 2 x 6 pieces nailed together. The middle piece has at its free end an elongated notch 22 for one of the hubs, or for a false hub or supporting tube 24, which in turn embraces the hub. A spacer block 26, of suitable size, may be used to fill the notch. The notch is purposely of a size to allow for variations in the distance between opposite decks, spacers 26 of different sizes being used. The two side pieces may be suitably recessed, if it is necessary to make the notch wider than the middle piece.

The free end of arm 20 is connected to an intermediate part of leg 18 by an inclined brace 28, which takes most of the weight. Lateral braces 30 and 32 take end thrust longitudinally of the freight car. A triangular piece 34 is nailed to the top to strengthen the joint, and to prevent the hub from being jarred out of its notch in transit. On the left of Figure 1, brace 30 is removed to show arm 20 more clearly.

In practice, leg 18 and arm 20 and brace 28 are ordinarily to be made up as a unit, in advance, braces 30 and 32 and piece 34 being nailed in place in the freight car. Not only does the deck contain less lumber than previous decks, but it leaves the lower automobile 12 entirely unobstructed. As this automobile is run in place after automobile 10 is decked, the work of blocking and securing it is much facilitated by the lack of any obstructing members in the deck.

While one illustrative embodiment has been described in detail, it is not my intention to limit the scope of the invention to that particular embodiment, or otherwise than by the terms of the appended claim.

I claim:

An automobile-shipping deck comprising, in combination, a horizontal arm having at its inner end an elongated notch for the hub, a spacer block in the notch to compensate for differences in the distances between opposite decks, horizontal diagonal braces for the inner end of the arm, and a downwardly inclined supporting brace for the inner end of the arm.

In testimony whereof I affix my signature.

E. T. CUNNINGHAM.